United States Patent
Zavodnick et al.

(10) Patent No.: US 10,364,556 B2
(45) Date of Patent: Jul. 30, 2019

(54) TENSION-BASED MECHANICAL COUPLING DEVICE

(71) Applicants: Daniel S. Zavodnick, Englewood, NJ (US); Alan Zavodnick, Boynton Beach, NJ (US); Matthew Patrick Coughlin, Yucaipa, CA (US)

(72) Inventors: Daniel S. Zavodnick, Englewood, NJ (US); Alan Zavodnick, Boynton Beach, NJ (US); Matthew Patrick Coughlin, Yucaipa, CA (US)

(73) Assignee: Hunter Innovations, LLC, Englewood, NJ (US)

( * ) Notice: Subject to any disclaimer, the term of this patent is extended or adjusted under 35 U.S.C. 154(b) by 267 days.

(21) Appl. No.: 15/174,252

(22) Filed: Jun. 6, 2016

(65) Prior Publication Data

US 2016/0356297 A1 Dec. 8, 2016

Related U.S. Application Data

(60) Provisional application No. 62/230,433, filed on Jun. 6, 2015, provisional application No. 62/219,774, filed on Sep. 17, 2015, provisional application No. 62/276,491, filed on Jan. 8, 2016.

(51) Int. Cl.
| | |
|---|---|
| *F16B 21/00* | (2006.01) |
| *E03C 1/04* | (2006.01) |
| *F16B 13/08* | (2006.01) |
| *F16B 19/00* | (2006.01) |
| *F16B 37/04* | (2006.01) |

(52) U.S. Cl.
CPC .......... *E03C 1/0401* (2013.01); *E03C 1/0402* (2013.01); *F16B 13/0808* (2013.01); *F16B 19/008* (2013.01); *F16B 37/043* (2013.01)

(58) Field of Classification Search
CPC ........................................................ E03C 1/0402
USPC ............................................. 285/33; 411/340
See application file for complete search history.

(56) References Cited

U.S. PATENT DOCUMENTS

| | | | |
|---|---|---|---|
| 1,375,747 A | 4/1921 | Zigray | |
| 1,467,936 A | 9/1923 | Janssen | |
| 2,132,284 A * | 10/1938 | Bonham | ............ F16B 13/0808 411/342 |

(Continued)

FOREIGN PATENT DOCUMENTS

| | | |
|---|---|---|
| DE | 202008017022 | 3/2009 |
| JP | 08199643 | 8/1996 |

*Primary Examiner* — Gary W Estremsky
(74) *Attorney, Agent, or Firm* — Cohen Grigsby, P.C.

(57) ABSTRACT

A mechanical-coupling device is described. The mechanical-coupling device includes a toggle bolt with a fixture in a bolt head that remateably mechanically couples to an attachment tool. The device may further include an anchor nut having an anchor wing or tab. During mechanical coupling of the anchor nut to the bolt with a mounting material, such as a wall, countertop or sink, between the bolt head and the anchor nut, the fixture may convey a pulling force, from the attachment tool, that results in fixing a position of the anchor nut with the anchor wing or tab in a deployed position. Moreover, the fixture may convey a rotational torque, from the attachment tool, about a symmetry axis of the bolt that rotates the bolt relative to the fixed position of the anchor nut so that a distance between the bolt head and the anchor nut decreases.

18 Claims, 12 Drawing Sheets

(56) References Cited

U.S. PATENT DOCUMENTS

| | | | |
|---|---|---|---|
| 2,293,411 A | 8/1942 | Spillman | |
| 2,384,525 A | 9/1945 | Beverly | |
| 3,175,452 A * | 3/1965 | Leitner | F16B 12/14 411/340 |
| 4,130,152 A | 12/1978 | Bolen | |
| 4,281,857 A * | 8/1981 | Randall | E03C 1/0401 24/498 |
| 4,339,971 A * | 7/1982 | Zatorre | F16B 23/0015 411/406 |
| 4,532,486 A * | 7/1985 | Terrier | H01H 89/08 335/13 |
| 4,810,146 A | 3/1989 | Sinclair | |
| 4,883,398 A * | 11/1989 | Duncan | B25B 31/00 411/344 |
| 4,943,253 A * | 7/1990 | Smith | B25B 31/00 29/271 |
| 5,090,276 A | 2/1992 | Groskey | |
| 5,353,667 A | 10/1994 | Wilner | |
| 5,515,882 A * | 5/1996 | Hennis | E03C 1/0401 137/315.12 |
| 5,582,548 A | 12/1996 | Czegledi | |
| 5,722,838 A | 3/1998 | Czegledi | |
| 5,875,606 A * | 3/1999 | Jensen | E04G 23/0207 52/741.41 |
| 6,023,901 A * | 2/2000 | Jensen | E04G 23/0203 408/72 R |
| 6,138,296 A | 10/2000 | Baker | |
| 6,237,168 B1 | 5/2001 | Daniel et al. | |
| 6,256,810 B1 | 7/2001 | Baker | |
| 6,381,776 B1 | 5/2002 | Wang | |
| 6,401,748 B1 | 6/2002 | Wang | |
| 6,421,849 B1 * | 7/2002 | Gray | E03C 1/0401 137/360 |
| 6,484,330 B2 | 11/2002 | Gray et al. | |
| 6,491,058 B1 | 12/2002 | Wang | |
| 6,526,851 B1 | 3/2003 | Fuerle | |
| 6,631,730 B1 * | 10/2003 | Bloom | E03C 1/0401 137/359 |
| 6,678,903 B1 | 1/2004 | Rhodes | |
| 6,725,472 B2 | 4/2004 | Gray et al. | |
| 6,807,692 B2 * | 10/2004 | Tsutsui | E03C 1/0401 137/359 |
| 6,912,742 B1 | 7/2005 | Wang | |
| 7,073,416 B2 | 7/2006 | Kozak et al. | |
| 7,216,440 B2 | 5/2007 | Zint | |
| 7,226,261 B1 * | 6/2007 | Bristol | F16B 13/0808 411/340 |
| 8,151,425 B2 * | 4/2012 | Cossart | B25B 7/02 29/244 |
| 8,370,971 B2 | 2/2013 | Wang | |
| 8,925,571 B2 | 1/2015 | Li et al. | |
| 2003/0204906 A1 | 11/2003 | Tsutsui et al. | |
| 2008/0131231 A1 | 6/2008 | Kuna et al. | |
| 2008/0253860 A1 | 10/2008 | McDuff et al. | |
| 2009/0103999 A1 | 4/2009 | Fucito | |
| 2012/0090435 A1 | 4/2012 | Dauletbayev | |
| 2013/0152398 A1 | 6/2013 | Wagstaff et al. | |
| 2013/0199623 A1 | 8/2013 | Lloyd | |

* cited by examiner

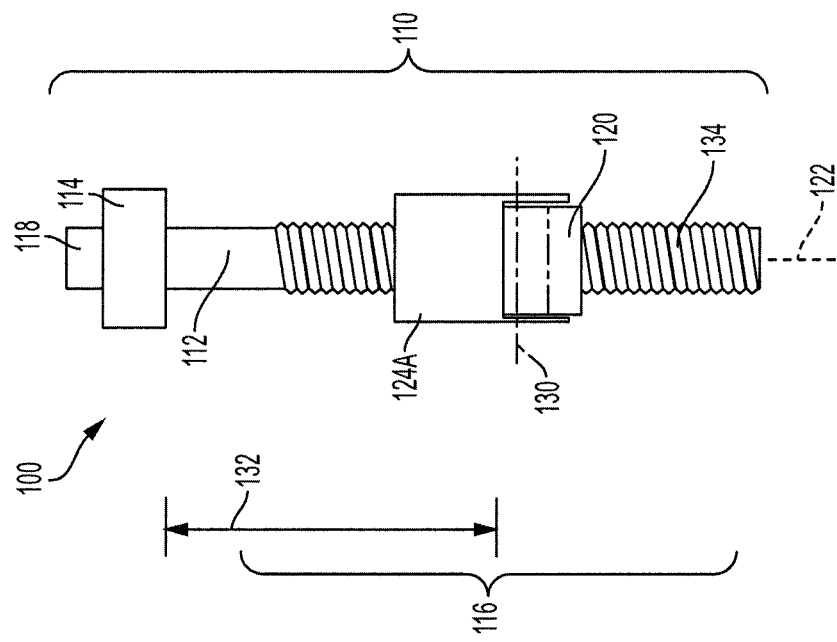
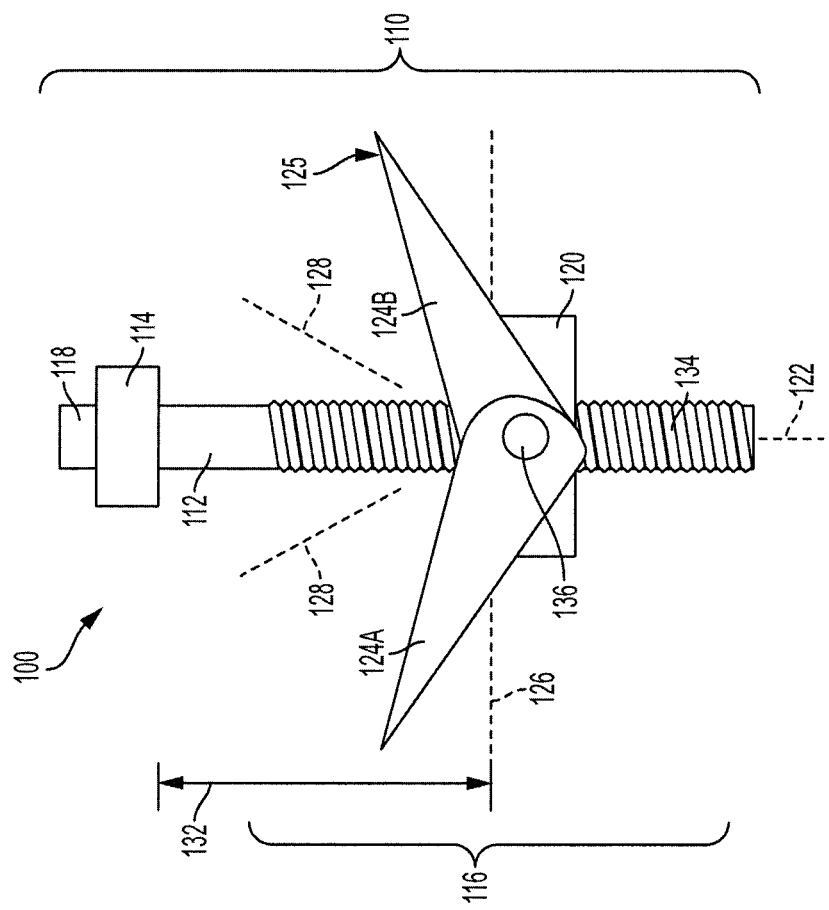

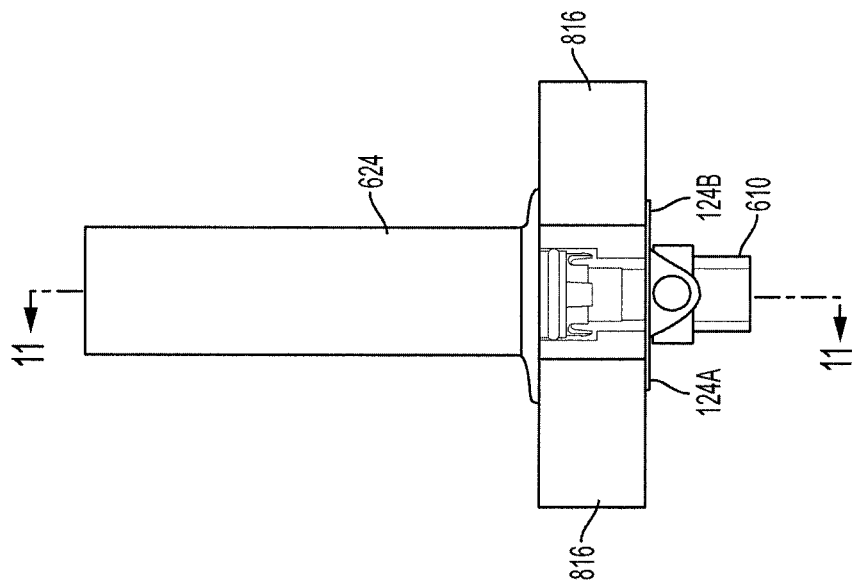
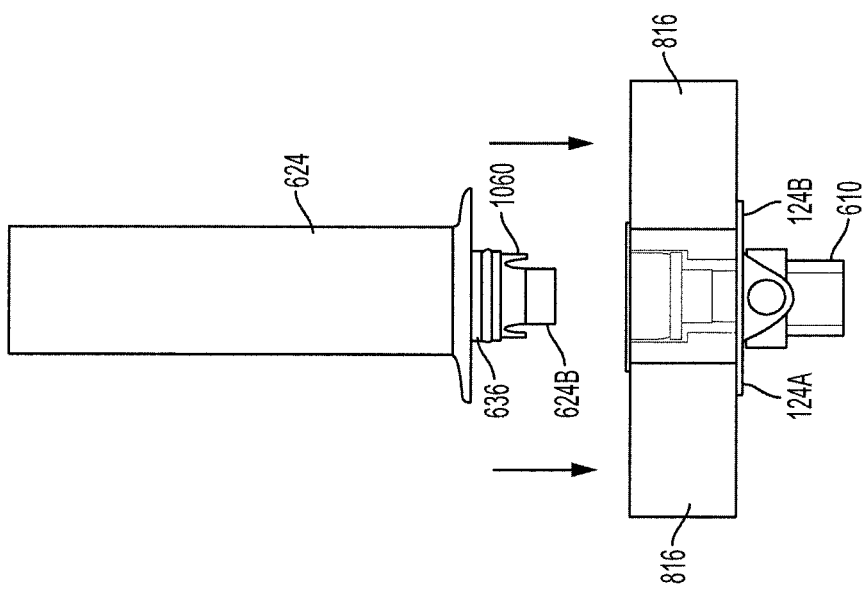
FIG. 10E
FIG. 10F

TENSION-BASED MECHANICAL COUPLING DEVICE

CROSS REFERENCE TO RELATED APPLICATIONS

The present application claims the benefit under 35 U.S.C. § 119(e) of prior U.S. Provisional Application No. 62/230,433 filed Jun. 6, 2015, U.S. Provisional Application No. 62/219,774 filed Sep. 17, 2015, and U.S. Provisional Application No. 62/276,491 filed Jan. 8, 2016, each having the title "Tension-Based Mechanical Coupling Device", the disclosure of each being incorporated herein by reference in its entirety.

TECHNICAL FIELD OF THE INVENTION

The present invention relates to devices and techniques for coupling a mechanical-coupling device to an object, and in particular, to a mechanical-coupling device that includes a toggle bolt and an anchor nut which may be coupled to an object using an attachment tool that is held in place by tension.

BACKGROUND OF THE INVENTION

Toggle bolts, which are sometimes referred to as "butterfly anchors", are widely used fasteners for hanging and, more generally, mechanically coupling objects to hollow walls such as dry wall or plaster, or surfaces such as a countertop or sink. Typically, a toggle bolt includes a nut and a bolt. The nut has wings that open inside the hollow wall, bracing against it to securely hold the toggle bolt in place. When the wings are opened, they usually cover a wider area than the cross-sectional area of the bolt. This spreads the weight of an object or secured item over a larger area, which increases the weight that can be secured by the toggle bolt compared to a regular bolt.

This improved utility, however, is offset by additional difficulties encountered when installing a toggle bolt. For example, a user needs to push a screw driver into a slotted head of a bolt portion of the toggle bolt with enough force to maintain contact between the screw driver and the bolt head. At the same time, the user must pull on the bolt so that anchor wings of the toggle bolt engage with the interior of the hollow wall or surface. This provides the counterforce required so that the advancing bolt head becomes threaded through the nut portion of the anchor wings. As such, the user must simultaneously apply two opposing forces on the toggle bolt: inward pressure exerted on the bolt head by rotation of the screw driver to advance the bolt relative to the anchor wings, and outward pressure on the anchor wings to maintain contact between the wings and the interior of the hollow wall or surface.

It can be challenging to perform these operations simultaneously. For example, the user may hand tighten the toggle bolt until the anchor wings engage, and may then use a screwdriver or drill bit to finalize the tightening. Alternatively, a user may employ a screwdriver throughout the installation process, but the user typically needs to also use their other hand to pull the bolt outward so as to engage the anchor wings against the interior of the hollow wall or surface.

However, in many applications, such as those in which a toggle bolt is being installed in a confined space, the user may not easily access a toggle bolt with both hands. Consequently, installing a toggle bolt can be difficult or tiring, which can be frustrating for users.

SUMMARY OF THE INVENTION

The presently disclosed invention overcomes many of the shortcomings of the prior art by providing a mechanical-coupling device and techniques for use thereof. The mechanical-coupling device may include a bolt having a bolt body and a bolt head attached to the bolt body, wherein at least a portion of the bolt body has threads and the bolt head includes a fixture configured to remateably mechanically couple to an attachment tool. The device may further include an anchor nut which is configured to rotatably mechanically couple to the bolt using the threads on the bolt body, wherein rotation of the anchor nut is about a symmetry axis of the bolt body, and an anchor wing rotatably mechanically coupled to the anchor nut, wherein rotation of the anchor wing, between a deployed position and a retracted position, is about an axis approximately perpendicular to the symmetry axis of the bolt body. The device may comprise more than one anchor wing, such as at least two anchor wings, wherein the anchor wings may be evenly spaced about a peripheral circumferential surface of the anchor nut.

During mechanical coupling of the anchor nut to the bolt with a mounting material between the bolt head and the anchor nut, the fixture is configured to convey a pulling force, from the attachment tool, that results in fixing a position of the anchor nut with the anchor wing in the deployed position, and a rotational torque, from the attachment tool, about the symmetry axis of the bolt body that rotates the bolt relative to the fixed position of the anchor nut so that a distance between the bolt head and the anchor nut decreases.

The fixture may include a slot, defined by a side surface, along a direction perpendicular to the symmetry axis of the bolt body, wherein the slot may be configured to remateably mechanically couple to the attachment tool.

The mechanical-coupling device may include a bolt body having an axial bore defining an internal passage having an inner surface, the bore aligned with the symmetry axis of the bolt body. Also included may be a sleeve configured to mechanically couple to the bolt within the bore of the bolt body, and to extend the internal passage of the bolt body with a second internal passage of the sleeve, which is defined by an inner surface of a bore of the sleeve. When the sleeve is mechanically coupled to the bolt, the internal passage of the bolt body and the internal passage of the sleeve are concentric when viewed along the symmetry axis of the bolt body.

The sleeve may be configured to mechanically couple to an outer surface of a faucet fixture. As such, the mechanical-coupling device may be configured to mount the faucet fixture onto one of a countertop and a sink without a second attachment tool needed to fix the position of the anchor nut.

The sleeve may include a fluid-sealing mechanism along a portion of an outer surface of the sleeve, wherein the fluid-sealing mechanism may be configured to make a fluid-tight seal with an outer surface of the faucet fixture, the inner surface of the bolt body, or both. The fluid-sealing mechanism includes an O-ring, a gasket, a seal, or any combination thereof.

The mechanical-coupling device may include an anchor nut comprising an anchor nut body having an internal bore defined by an internal surface and a symmetry axis, at least two anchor wings extending radially from the anchor nut body in a direction perpendicular to the symmetry axis of the internal bore, and at least two anchor tabs extending axially from the anchor nut body in a direction parallel with the symmetry axis of the anchor nut body, each anchor tab having ribs on a portion of a surface thereof. The mechanical-coupling device may further include a bolt configured to mechanically couple to the anchor nut, the bolt having an internal bore defined by an internal surface and a symmetry axis, and at least two anchor tab apertures configured to receive the at least two anchor tabs.

The at least two anchor tabs may be configured to mechanically couple the anchor nut to the bolt by passage through each of the at least two anchor tab apertures on the bolt, in a direction parallel to the symmetry axis of the internal bores of each of the anchor nut body and the bolt, so that the internal bore of the anchor nut body and the internal bore of the bolt are concentric when viewed along the symmetry axis of the bolt. Thus, after mechanical coupling of the anchor nut to the bolt, the at least two anchor tabs may be designed so that a portion of each which extends beyond a top surface of the bolt are configured to be snapped, broken, or cut off.

Furthermore, the at least two anchor wings may be rotatably mechanically coupled to the anchor nut, wherein rotation of the anchor wings between a deployed position and a retracted position is about the axis that is perpendicular to the symmetry axis of the internal bore of the anchor nut body. Thus, when a deployment force, along a first direction parallel to the symmetry axis, is applied to the anchor nut at a first off-axis position relative to the symmetry axis, a resulting deployment torque rotates the anchor wings until limited by a first mechanical stop so that a radial extent of the anchor wings in the deployed position is a predefined distance from the symmetry axis of the internal bore of the anchor nut body. Further, when a retraction force, along a second direction parallel to the symmetry axis and antiparallel to the first direction, is applied to the anchor wings at a second off-axis position relative to the symmetry axis, a resulting retraction torque rotates the anchor wings until limited by a second mechanical stop so that a radial extent of the anchor wings is greater than the predefined distance. As such, during mechanical coupling of the anchor nut to the bolt, the anchor wings in the deployed position contact an internal surface which fixes a position of the anchor nut so that a distance between the anchor nut and the bolt is decreased.

The at least two anchor wings may be non-rotatably attached to the anchor nut and may extend radially from the anchor nut body in the direction perpendicular to the symmetry axis of the internal bore of the anchor nut body. As such, an uneven deployment force may be applied to each of the at least two anchor tabs to move the anchor nut through an orifice in a barrier, wherein the deployment force is along a direction parallel to a symmetry axis of the orifice and the uneven deployment force causes the anchor nut body to be positioned at an angle defined by a radial plane of the internal bore of the anchor nut body and the symmetry axis of the orifice, wherein the angle is not 90 degrees. A retraction force may then be applied to the at least two anchor tabs in a direction parallel to the symmetry axis of the orifice and anti-parallel to the deployment force, wherein the retraction force moves the anchor nut body to a position wherein the angle defined by a radial plane of the internal bore of the anchor nut body and the symmetry axis of the orifice is 90 degrees so that the at least two anchor wings contact an internal surface of the barrier which fixes a position of the anchor nut. When the anchor nut body is mechanically coupled to the bolt, the symmetry axis of the anchor nut body and the symmetry axis of the bolt are concentric.

Also included for use with this mechanical-coupling device may be a sleeve as disclosed above. At least a portion of the internal surface of the bolt may have threads or ribs that mechanically couple with threads or ribs on the external surface of the sleeve. Alternately, at least a portion of the internal surface of the anchor nut body has threads or ribs that mechanically couple with threads or ribs on the external surface of the sleeve.

The present invention also provides a method for mechanically coupling the anchor nut to the bolt in the mechanical-coupling device using the attachment tool. Also provided are kits which include the anchor nuts and bolts described herein, and optionally written and/or illustrated inserts that detail methods of use of the kit components for various installation procedures.

This summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description, figures, and claims.

BRIEF DESCRIPTION OF THE DRAWINGS

A better understanding of the present invention will be had upon reference to the following detailed description when read in conjunction with the accompanying drawings, wherein like numerals represent like features in the various views. It is to be noted that features and components in these drawings, illustrating the views of embodiments of the present invention, unless stated to be otherwise, are not necessarily drawn to scale.

FIG. 1 is a drawing illustrating a side view of a mechanical-coupling device in accordance with certain aspects of the present disclosure.

FIG. 2 is a drawing illustrating a side view of the mechanical-coupling device of FIG. 1 showing a toggle nut (120) rotated 90 degrees about an axis (122) of a bolt body (112).

FIGS. 10E and 10F are drawings illustrating a side view of the faucet shank having a sleeve mounted thereon as shown in FIG. 10C being inserted into the faucet assembly as installed on the barrier shown in FIG. 10D.

DETAILED DESCRIPTION OF THE INVENTION

Figure 3A:
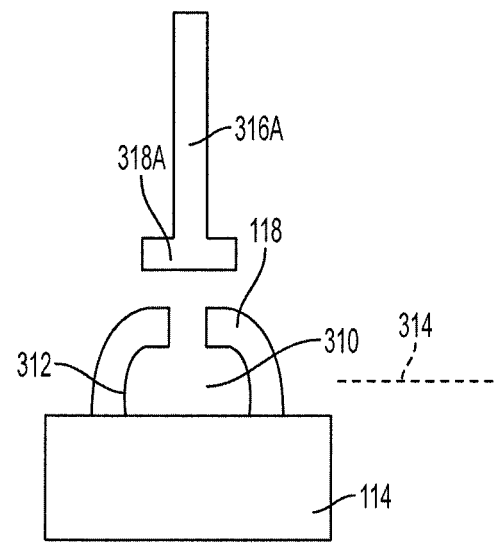
FIG. 3A is a drawing illustrating a side view of a bolt head with a fixture in the mechanical-coupling device of FIG. 1, the view being rotated 90 degrees about the axis (122) of the bolt body (112), and showing an attachment tool.

A mechanical-coupling device is described. The mechanical-coupling device may include a toggle bolt having a bolt body and a bolt head, and an anchor nut having an anchor wing attached thereto. The bolt head includes a fixture that may be remateably mechanically coupled to an attachment tool. During mechanical coupling of the anchor nut to the toggle bolt with a mounting material such as, for example, a hollow wall, countertop or sink, between the bolt head and the anchor nut, the fixture may convey a pulling force, from the attachment tool, that results in fixing a position of the anchor nut with the anchor wing in a deployed position. Moreover, the fixture may convey a rotation torque, from the attachment tool, about a symmetry axis of the toggle bolt that rotates the bolt relative to the fixed position of the anchor nut so that a distance between the bolt head and the anchor nut decreases.

By providing a means to convey the pulling force and the rotation torque simultaneously, the unique design of the bolt head and use of the attachment tool may make it easier for a user to install the mechanical-coupling device. For example, the user may install the mechanical-coupling device using one hand, such as by using a screwdriver or a drill to install the bolt without using their other hand to exert an outward force that engages the anchor wing with the mounting material. This installation operation may not have previously been safely possible for a user to perform without risk of injury. Furthermore, the fixture may maintain the remateable mechanical coupling with the attachment tool during installation. Consequently, the mechanical-coupling device may reduce user time, effort and frustration during installation.

Various aspects of the mechanical-coupling device may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

In the discussion that follows, "remateable mechanical coupling" or "remateably mechanically coupled" should be understood to mean that mechanical coupling can be established between two components and then broken. Moreover, "rotatable mechanical coupling" or "rotatably mechanically coupled" should be understood to mean that the mechanical coupling has a rotational degree of freedom, such that one component can be rotated about an axis of rotation with respect to another component while maintaining the mechanical coupling (e.g., a bolt and a nut).

Various aspects of the mechanical-coupling device may be illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Furthermore, throughout the specification, reference to "one embodiment," "an embodiment," or "some embodiments" means that a particular described feature, structure, or characteristic is included in at least one embodiment. Thus, appearances of the phrases "in one embodiment," "in an embodiment," or "in some embodiments" in various places throughout this specification are not necessarily all referring to the same embodiment. Those skilled in the art will recognize that the various embodiments can be practiced without one or more of the specific details or with other methods, components, materials, etc. In other instances, well-known structures, materials, or operations are not shown or not described in detail to avoid obscuring aspects of the embodiments.

Relative terms such as "lower" or "bottom" and "upper" or "top" may be used herein to describe one element's relationship to another element illustrated in the drawings. It will be understood that relative terms are intended to encompass different orientations of aspects of the mechanical-coupling device in addition to the orientation depicted in the drawings. By way of example, if aspects of the mechanical-coupling device shown in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. Thus, for example, reference to "a" toggle bolt, "an" anchor nut, "an" anchor wing, or "a" fixture, is a reference to one or more of each and equivalents thereof known to those skilled in the art, and so forth. Further, use of a plural reference in a specific context should not be taken to negate that a singular form found elsewhere within this description may also include the plural. Unless defined otherwise, all technical and scientific terms used herein have the same meanings as commonly understood by one of ordinary skill in the art.

FIG. 1 presents a drawing illustrating a side view of a mechanical-coupling device 100. This mechanical-coupling device 100 includes a bolt 110, which is sometimes referred to as a "toggle bolt," having a bolt body 112 and a bolt head 114 attached to the bolt body 112. At least a portion 116 of the bolt body 112 has threads 134. Further, the bolt head 114 includes a fixture 118 that may be remateably mechanically coupled to an attachment tool (316A, 316B, 316C described below with reference to FIGS. 3A, 3B, and 3C).

The mechanical-coupling device 100 may include an anchor nut 120, which is sometimes referred to as a "toggle nut," that may be rotatably mechanically coupled to the bolt 110 using the threads 134 on the bolt body 112. That is, the anchor nut 120 may include threads on an internal surface (not shown) that correspond to threads 134 on the bold body 112, and which provide rotation of the anchor nut 120 about a symmetry axis 122 of the bolt body 112. Furthermore, the mechanical-coupling device 100 may include an anchor wing (shown as two anchor wings: 124A and 124B) rotatably mechanically coupled to the anchor nut 120, where rotation of the anchor wing(s) (124A, 124B) between a maximum deployed position 126 and a retracted position 128 is about an axis 130 (FIG. 2) approximately perpendicular to the symmetry axis 122 of bolt body 112. The rotation of the anchor wing(s) (124A, 124B) about the axis 130 may be facilitated by connection or attachment of an end portion of each anchor wing on the anchor nut 120, such as by connection to a support member or projection 136.

FIG. 2 presents a drawing illustrating a different side view of the mechanical-coupling device 100 which shows the toggle nut 120 rotated 90 degrees about the axis 122 of the bolt body 112 so that only one anchor wing 124A is visible. Also shown are the axis 130 of rotation of the anchor wing(s), the bolt body 112, the bolt head 114 and the fixture 118, and the threads 134.

FIG. 3A presents a drawing illustrating a side view of the bolt head 114 rotated 90 degrees from the view shown in FIGS. 1 and 2, so that the slot 310 of the fixture 118 of the mechanical-coupling device 100 is shown. The slot 310 may be defined by a side surface 312 which is formed along a direction 314 perpendicular to the symmetry axis 122 of the bolt body 112. More generally, the slot 310 may be any opening or partially enclosed cavity into which an attachment tool can be inserted. An attachment tool 316A may be remateably mechanically coupled to the fixture 118 via the slot 310. For example, the attachment tool 316A may be a hex key or a screw driver that includes a male key 318A that corresponds to and mates with or fits into the slot 310.

Figure 3C:
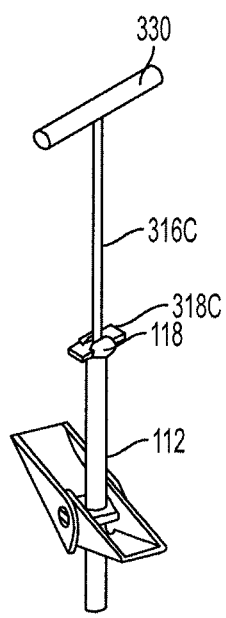
FIG. 3C is a perspective view of a manual attachment tool remateably mechanically attached to the fixture of the bolt head in accordance with certain aspects of the present disclosure.
Figure 3B:
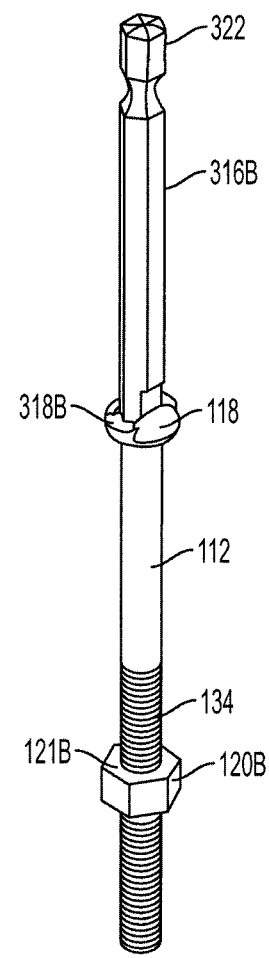
FIG. 3B is a perspective view of a drill bit attachment tool which is remateably mechanically attached to the fixture of the bolt head in accordance with certain aspects of the present disclosure.

As shown in FIG. 3B, the attachment tool 316B may include a drill bit having a male key 318B at an end which may engage the slot of the fixture 118 in the bolt head. The drill bit may allow a user to attach an end 322 of the attachment tool 316B, such as an end opposite from the male key 318B, to a standard drill. Both the drill bit attachment tool 316B and the hex key attachment tool 316A may also be engaged by a socket wrench or a socket screwdriver. Also shown in FIG. 3B is a nut 120B engaged on the threads 134 of the bolt body 112.

With reference to FIG. 3C, the attachment tool 316C may include a hand tool which may be engaged with the fixture 118 via the male key 318C such that a user may grasp a handle 330 and provide rotation of the anchor nut 120 about a symmetry axis 122 of the bolt body 112.

Alternatively, the attachment tool (316A, 316B, 316C) may have a female piece or component (such as a slot) that matches and mates with a male key on the bolt head 114. Furthermore, while a specific size and shape for the slot 310 is shown in FIGS. 3A, 3B, and 3C, alternate shapes or configurations which provide remateable mechanical coupling of the attachment tool (316A, 316B, 316C) to the fixture 118 of the bolt head 114 are within the scope of the present invention.

Referring back to FIG. 1, during mechanical coupling of the anchor nut 120 to the bolt 110 with a mounting material between the bolt head 114 and the anchor nut 120, the fixture 118 may convey a pulling force, from the attachment tool, that results in fixing a position of the anchor nut 120 with the anchor wings (124A, 124B) in a maximum deployed position 126. Moreover, the fixture 118 may convey a rotational torque, from the attachment tool, about the symmetry axis 122 that rotates the bolt 110 relative to the fixed position of the anchor nut 120 so that a distance 132 between the bolt head 114 and the anchor nut 120 decreases.

Figure 4:
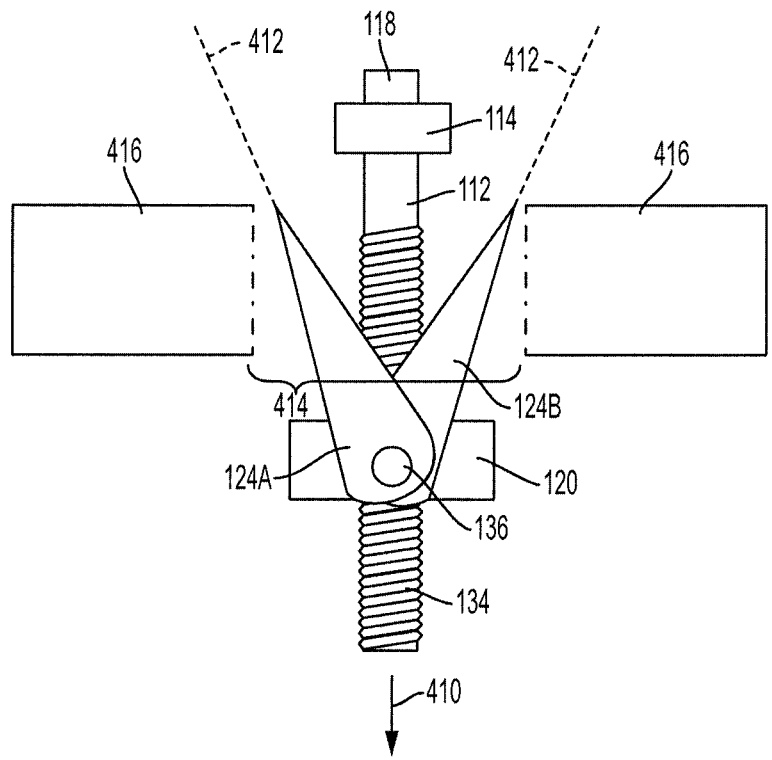
FIG. 4 is a drawing illustrating installation of the mechanical-coupling device of FIG. 1 through a barrier with anchor wings partially retracted.
Figure 5:
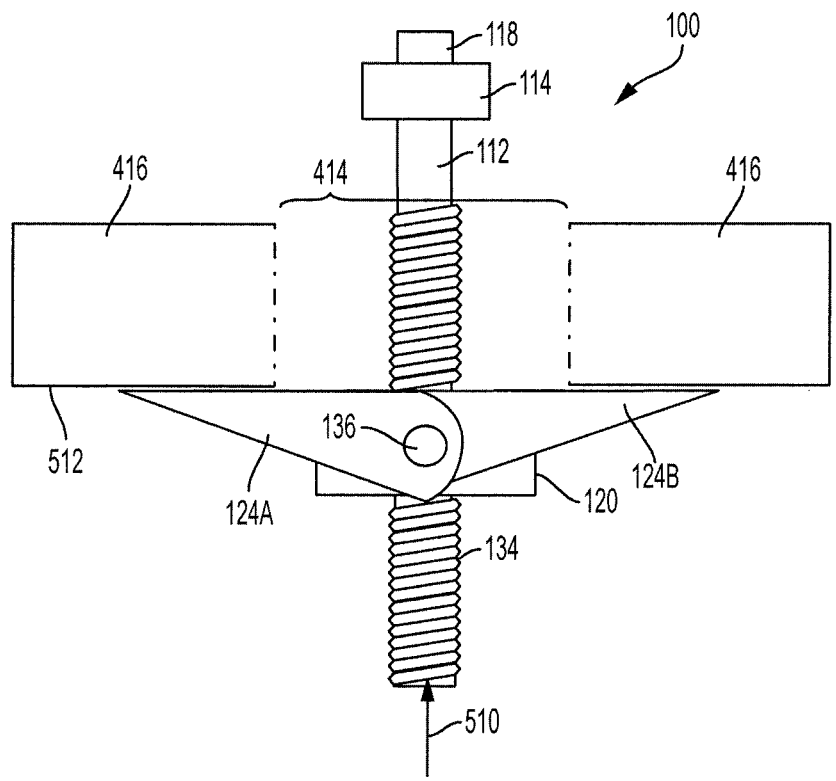
FIG. 5 is a drawing illustrating installation of the mechanical-coupling device of FIG. 1 through a barrier with the anchor wings extended.

An exemplary embodiment of the installation of the mechanical-coupling device 100 (FIG. 1) is shown in FIGS. 4 and 5. Referring to FIG. 4, when a deployment force along a direction 410 parallel to the symmetry axis 122 is applied to the anchor wing(s) (124A, 124B) at a first off-axis position relative to the symmetry axis 122 (such as deployed position 412, which may be less than maximum deployed position 126 in FIG. 1), a resulting deployment torque may rotate the anchor wing(s) (124A, 124B) until limited by a first mechanical stop, or a limit position of the anchor wing(s) (124A, 124B), so that a radial extent of the anchor wing(s) (124A, 124B) in the deployed position 412 is a predefined distance from the symmetry axis 122. For example, the deployment torque may result from a force from a hole 414 defined by a surface in a hollow barrier 416 (i.e., a wall or countertop having a finite thickness and a cavity or a space behind or on the other side) when the deployment force pushes the mechanical-coupling device 100 into the hole 414. In this example, the predefined distance may correspond to a diameter of the hole 414, such as a predefined distance that allows the wing(s) (124A, 124B) to be passed through the hole 414. The deployment force may be a pushing force applied to a top of the bolt 110, such as a force along the direction 410 applied to the bolt head 114 or fixture 118, either directly or via the attachment tool (e.g., 316A, 316B, 316C).

Moreover, as shown in FIG. 5, which presents a drawing illustrating installation of the mechanical-coupling device 100 (FIG. 1), when a retraction force, along a direction 510 parallel to the symmetry axis 122 and anti-parallel to the direction 410, is applied to the anchor wing(s) (124A, 124B) at a second off-axis position relative to the symmetry axis 122, a resulting retraction torque may rotate the anchor wing(s) (124A, 124B) until limited by a second mechanical stop (such as a mechanical stop associated with the maximum deployment position 126) so that a radial extent of the anchor wing(s) (124A, 124B) is greater than the predefined distance, such as the distance 414 shown in FIG. 4.

During mechanical coupling of the anchor nut 120 to the bolt 110 to secure the mechanical coupling device 100 to a wall or other barrier, the fixture 118 may receive the retraction force, from the attachment tool, along the direction 510. This results in friction between the anchor wing(s) (124A, 124B) in the deployed position, such as the maximum deployment position 126, and an internal surface 512 of the hollow barrier 416 (e.g., wall, countertop, sink, or plaster) which is in contact with the anchor wing(s) (124A, 124B), and which fixes a position of the anchor nut 120. Concurrently, the fixture 118 may receive a rotational torque, from the attachment tool, about the symmetry axis 122 that rotates the bolt 110 relative to the fixed position of the anchor nut 120 so that the distance 132 (FIG. 1) between the bolt head 114 and the anchor nut 120 decreases.

The anchor wing(s) (124A, 124B) may include alternate or additional materials (e.g., rubberized material or surface), or alternate or additional surface patterns (e.g., spikes) on at least the facing surface 125 (FIG. 1) which may increase the friction between the anchor wing(s) (124A, 124B) in the deployed position and the internal surface 512 of the hollow barrier 416.

The anchor nut 120 may position, or be configured to position, the anchor wings (124A, 124B) in a maximum deployed position 126 when in a resting state. As such, installation of the device 100 through a barrier 416 may place a tension on the anchor wings (124A, 124B) about the axis 130 so that so that a radial extent of the anchor wing(s) (124A, 124B) in the deployed position 412 is a predefined distance from the symmetry axis 122. Once the anchor nut 120 and attached anchor wing(s) (124A, 124B) are fully passed through the barrier 416, such as through the hole 414, the anchor wing(s) (124A, 124B) may extend to their resting state (fully deployed position 126).

Alternatively, the anchor nut 120 may position, or be configured to position, the anchor wings (124A, 124B) in a retracted position such as, for example, a position between the retracted position 128 and the fully deployed position 126 (FIG. 1) when in a resting state. As such, installation of the device 100 through a barrier 416 may place little tension on the anchor wings (124A, 124B) as they pass through the hole in the barrier 416. However, once the anchor nut 120 and attached anchor wing(s) (124A, 124B) are fully passed through the barrier 416, such as through the hole 414, the retraction force in direction 510 may place a tension on the anchor wing(s) (124A, 124B) which may force them into a fully deployed position 126.

The mechanical-coupling device 100 may mechanically couple the bolt 110 and the anchor nut 120 using the single attachment tool without the need for a second attachment tool, or the user's other hand, to fix the position of the anchor nut 120. Thus, the user may use a screwdriver, drill or hand tool to install the mechanical-coupling device without using their other hand to exert the outward force during the installation, making the presently disclosed invention both easier and safer to use.

The mechanical-coupling device 100 may include more components or fewer components. For example, two or more components in the mechanical-coupling device 100 may be combined into a single component. In particular, the anchor wing(s) (124A, 124B) and anchor nut 120 may be a single component. In another example, the anchor wing(s) (124A, 124B) may be a single wing, two (2) wings as shown in FIGS. 1-5, or even more wings such as, for example, four (4) wings which may be evenly spaced about a radial axis of the anchor nut 120. Moreover, the positions of one or more components in the mechanical-coupling device 100 may be changed.

The fixture 118 may be included on other types of bolts or attachment elements other than a toggle bolt. For example, the fixture 118 may be included on the heads for bolts and/or screws such as, for example, a bolt for use with a nut that does not include anchor wings, a screw that does not use a nut, and/or other types of anchors. The fixture 118 may keep a screwdriver, drill bit or hand-tool in contact with the bolt head 114 during installation. That is, the fixture 118 may keep a screwdriver, drill bit or hand-tool in contact with the bolt head 114, to enable a user to pull back on the bolt to engage a coupled nut on an inner surface of the barrier, and simultaneously rotate the bolt during installation.

An example of such an embodiment is shown in FIG. 3B, where the anchor nut 120B does not include anchor wing(s) (124A, 124B). The anchor nut 120B may include other means to create friction between the inner surface of the barrier 416, such as the surface 512 shown in FIG. 5, and a facing surface 121B of the anchor nut 120B. Such means may include alternate or additional materials (e.g., rubberized), or alternate or additional surface patterns (e.g., spikes) on at least the facing surface 121B of the anchor nut 120B. In such an arrangement, the anchor nut 120 would not pass through the barrier 416 but would need to be engaged with the bolt 112 from the opposite side of the barrier.

The fixture 118 and/or the bolt head 114 may be made from a magnetic material that has a non-zero net magnetic moment (i.e., it is magnetized), or may be non-magnetic. Furthermore, a wide variety of materials may be used in forming the mechanical-coupling device 100, including at least a metal material, an insulator material, a plastic material, an organic material, an inorganic material and/or a composite material (such as carbon fiber). Moreover, the mechanical-coupling device 100 may be fabricated using a wide variety of fabrication techniques as known to one of skill in the art, such as, for example, milling, machining, casting, stamping, 3-dimensional printing, deposition, etching and/or plating.

The present invention also provides kits comprising the various components of the mechanical-coupling device 100, such as any of the various anchor nuts 120 and bolts 110 described herein. The kits may include an adapter (e.g., an attachment tool) configured to work with the enclosed mechanical-coupling device 100. The kits may further include a written and/or illustrated insert which may describe a method of use of the components of the kit. In certain kits, a single (1) adapter may be included with a larger number of anchor nuts 120 and bolts 110, such as more than 5, or 10, or 25. In certain kits, two (2) adapters may be included with a larger number of anchor nuts 120 and bolts 110, such as more than 5, or 10, or 25.

Figure 6:
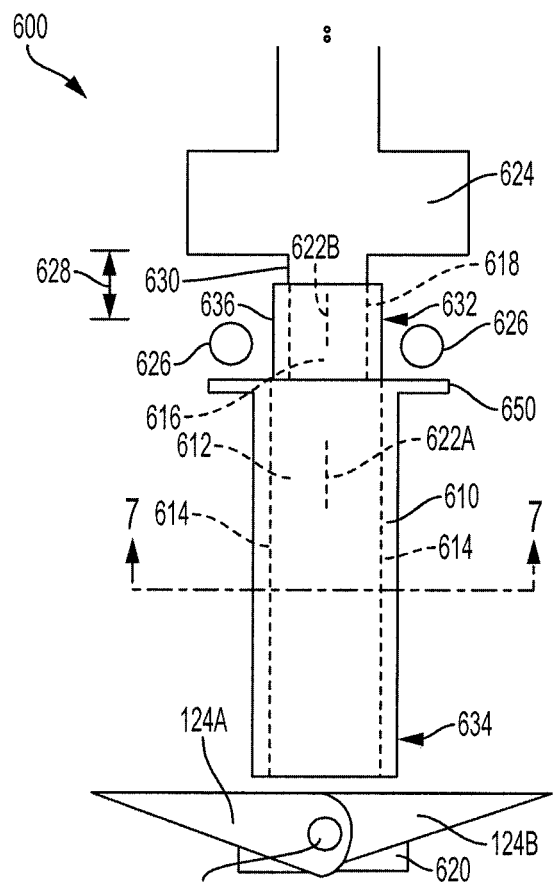
FIG. 6 is a drawing illustrating a side view of components in a faucet assembly in accordance with certain aspects of the present disclosure.

The mechanical-coupling device of the present invention may be included in a faucet assembly, and may facilitate easy assembly of a faucet on a sink or countertop, such as in a bathroom or kitchen. FIG. 6 presents a drawing illustrating a side view of the components in a faucet assembly 600, which is sometimes referred to as a "faucet installation fixture". The faucet assembly 600 may include a bolt 610 having an outer surface 634 onto which an anchor nut 620 may be mechanically engaged, such as by threads on the outer surface 634 of the bolt 610 and matching threads on an inner surface of the anchor nut 620.

The faucet assembly 600 may further include an optional sleeve 636 which may be mechanically coupled to the bolt 610 (e.g., by threads or tabs) to extend an internal passage 612 of the bolt 610 that is defined by an inner surface 614, with an internal passage 616 of the sleeve 636 which is defined by an inner surface 618. For example, the internal passage 612 of the bolt 610 may be a cylindrical internal passage defined by an inner surface 614 and a symmetry axis 622A that is parallel to the symmetry axis 622B of the sleeve 636. Moreover, the internal passage 616 of the sleeve 636 may be a cylindrical internal passage 616 defined by an inner surface 618 and may have a symmetry axis 622B that is parallel to a symmetry axis (not shown) of the faucet fixture 624.

Figure 7:
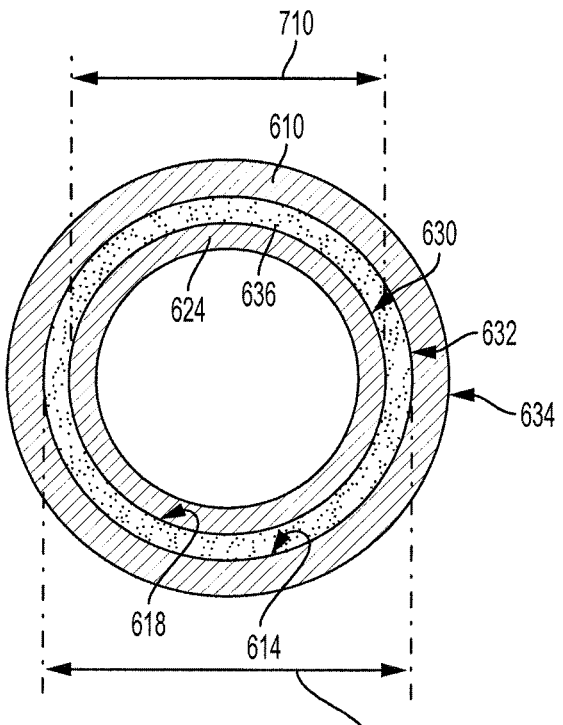
FIG. 7 is a drawing illustrating a cross sectional view of the faucet assembly taken along line 7-7 of FIG. 6.

As shown in FIG. 7, which presents a cross-sectional view of the components of the faucet assembly 600 taken along line 7-7 of FIG. 6, the outer surface 630 of the faucet fixture 624 may have with a diameter 710 that fits within a diameter formed by of an inner surface 618 of the sleeve 636. Similarly, the outer surface 632 of the sleeve 636 may have a diameter 712 that fits within a diameter formed by an inner surface 614 of the bolt 610. Finally, the outer surface 634 of the bolt 610 may have a total diameter which fits within a hole formed in a barrier (see for example barrier 416 in FIG. 5, or barrier 816 in FIG. 8B). The sleeve 636 may be separate from the bolt, as shown, or may be combined with, or integral with, the bolt 610. Alternatively, no sleeve 636 may be included. In such a case, the diameter 712 of the inner surface 614 of the bolt 610 may be sized and configured to accept a diameter of an outer surface 630 of the faucet fixture 624.

Referring back to FIG. 6, the sleeve 636 may be mechanically coupled to the outer surface 630 of the faucet fixture 624, and the mechanical-coupling device (faucet assembly 600) may mount the faucet fixture 624 onto a countertop or a sink without use of a second attachment tool (or a user's hand) to fix the position of the anchor nut 620. As noted previously, the user may use a screwdriver, drill or hand tool to install the mechanical-coupling device without using their other hand to exert the outward force, or in the case of a countertop the upward force, during the installation. More generally, the user may not have to squeeze into tight spaces under a sink, fumbling around with unwieldy wrenches, and trying to reach virtually inaccessible nuts and bolts. When the sleeve 636 is mechanically coupled to the bolt 610, the inner passages 612 and 616 may be concentric when viewed along symmetry axis 622A and/or symmetry axis 622B.

With continued reference to FIG. 6, the bolt 610 may include an integral lip 650 that has a diameter which is greater than a diameter of the outer surface 634 of the bolt 610. Additionally, the sleeve 636 may include a fluid-sealing mechanism 626 along a portion of the outer surface 632 of the sleeve 636. The fluid-sealing mechanism 626 may make a fluid-tight seal with the inner surface 614 of the bolt 610. The sleeve 636 may also include a fluid-sealing mechanism positioned on an end surface, or an inner surface, of the sleeve 636 which may make a fluid-tight seal with the outer surface of the faucet fixture 624 (see 1026B of FIG. 10). The fluid-sealing mechanism 626 may include one or more of an O-ring, a gasket, a seal, or any combination thereof. Furthermore, the sleeve 636 may have a predefined overlap, such as 1 to 3 inches of overlap, with the outer surface 630 of the faucet fixture 624 along a length 628 of the faucet fixture 624.

When included in the faucet assembly 600, the sleeve 636 may be remateably mechanically coupled to the bolt 610. Such coupling means may include flexible ribs or tabs that may allow the sleeve 636 to be pushed into place within the inner passage 612 of the bolt 610, or may include threads that may allow the sleeve 636 to be screwed or threaded into matching threads on an inner surface 614 of the bolt 610.

Alternatively, the sleeve 636 may be rigidly mechanically coupled to the bolt 610. For example, the sleeve 636 may snap into position relative to the bolt 610, such as by using flexible snaps or tabs protruding from an outer surface 630 along a radial perimeter of the sleeve 636. Alternatively or additionally, the sleeve 636 may press fit into position relative to the bolt 610, and may rely on friction to seal with and grip the bolt 610. The anchor wing(s) (124A and 124B) may be removable or detachable, so that the faucet assembly can be removed, repaired and/or replaced.

Figure 8A:
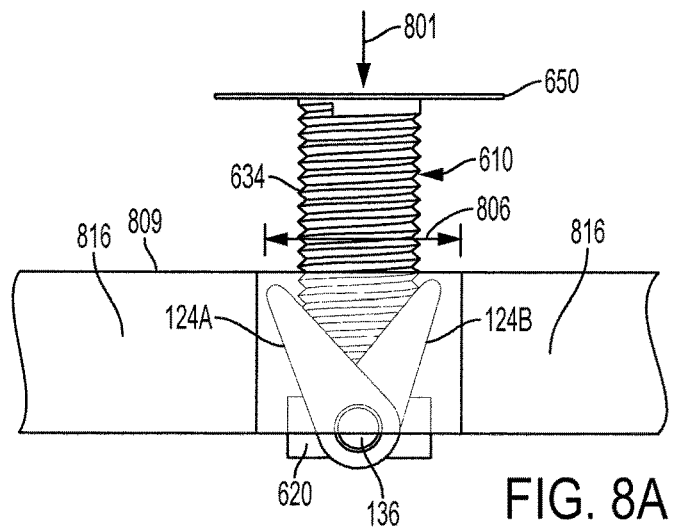
FIG. 8A is a drawing illustrating a side view of a faucet assembly partially installed through a barrier in accordance with certain aspects of the present disclosure.

As discussed above, and with reference to FIG. 8A, installation of the faucet assembly 600 may be achieved from a top position on a barrier 816, such as at countertop level, and does not require that the user have any access to the area below the countertop (e.g., under the sink). The bolt 610 having an anchor nut 620 threadedly attached thereon is pushed through a hole 806 in the barrier 816 along a direction 801 parallel to a longitudinal axis of the hole 806. As was discussed with reference to the toggle bolt in FIG. 4, the anchor wing(s) (124A, 124B) on the anchor nut 620 may be displaced from the fully extended position (shown in FIG. 8B) by the force of the side walls of the hole 806 in the barrier 816, thus allowing the bolt 610 and anchor nut 620 to pass through the hole 806 until the integral lip 650 comes into contact with a top surface 809 of the barrier 816. An outer diameter of the integral lip 650 is larger than the diameter of the hole 806, thus providing a stop point or support for the faucet assembly 600 on the barrier 816.

Figure 8B:
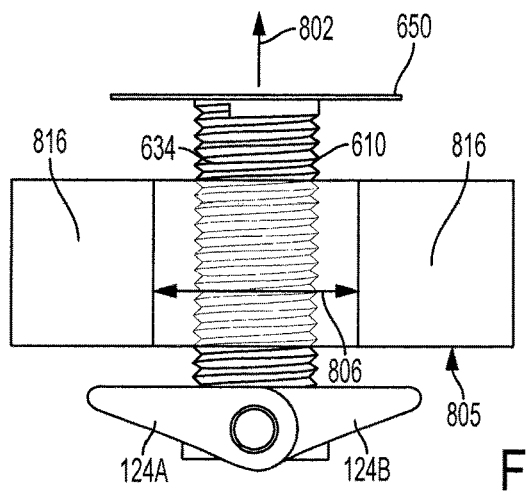
FIG. 8B is a drawing illustrating a side view of the faucet assembly of FIG. 8A installed through the barrier, with anchor wings extended.

As shown in FIG. 8B, once the bolt 610 and anchor nut 620 are pushed through the hole 806, such as to the stop point where the integral lip 650 contacts the top surface 809 of the barrier 816, the anchor wing(s) (124A, 124B) may open to their fully extended position, which is shown in FIG. 8B as lying along a plane that is perpendicular to the longitudinal axis of the hole 806, and generally parallel with a bottom surface 805 of the barrier 816. Once the anchor wing(s) (124A, 124B) are fully extended, a pulling force along direction 802, which is antiparallel to the direction 801 of installation, may be exerted on the bolt 610 and anchor nut 620 via an attachment tool, thus bringing the anchor wing(s) (124A, 124B) into contact with the bottom surface 805 of the barrier 816.

Figure 8C:
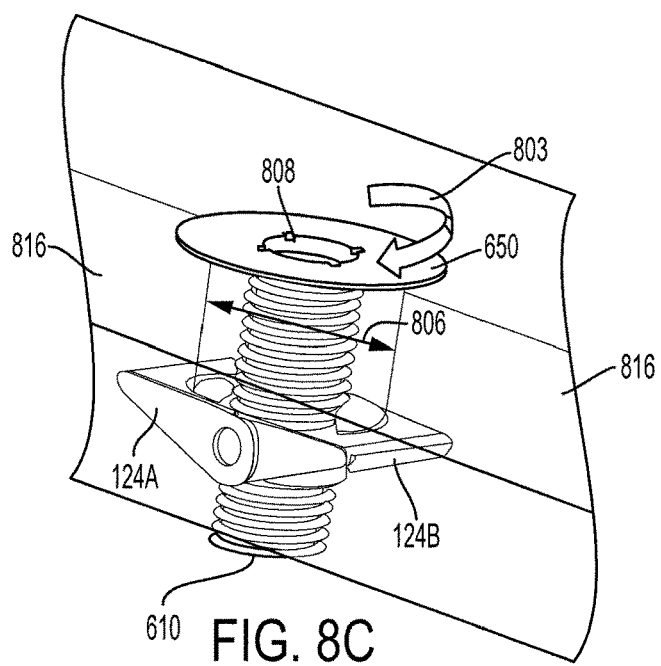
FIG. 8C is a drawing illustrating a perspective view of the faucet assembly of FIG. 8B secured on the barrier.

As shown in FIG. 8C, simultaneous to the pulling force along direction 802, which holds the anchor wing(s) (124A, 124B) in frictional contact with the bottom surface 805 of the barrier 816, a rotational force along direction 803 may be applied using the attachment tool. This rotational force may cause the bolt 610 to rotate (in direction 803) with respect to the anchor nut 620 so that the distance between the integral lip 650 of the bolt 610 and the anchor nut 620 is decreased. The pulling force along direction 802 and rotational force along direction 803 may be continued until the integral lip 650 of the bolt 610 comes into contact with the upper surface 809 of the barrier 816 (the anchor wings generally already in contact with the bottom surface of the barrier).

Figure 9:
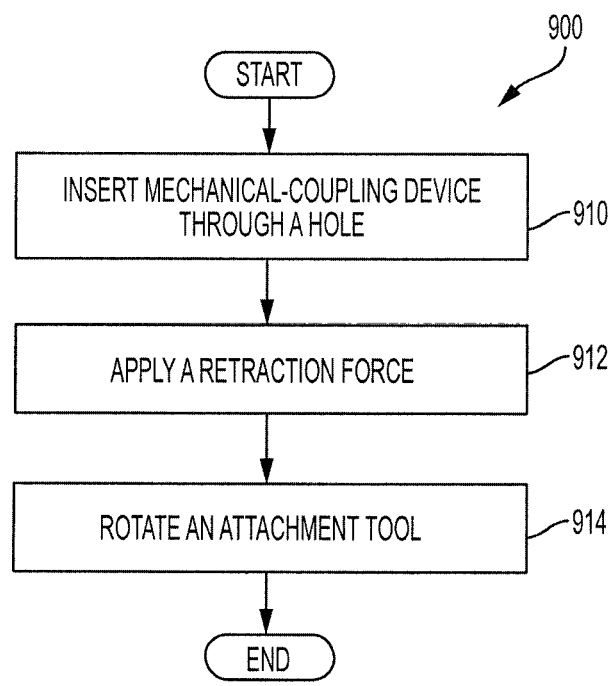
FIG. 9 is a flow diagram illustrating a method for mechanically coupling an anchor nut to a bolt in a mechanical-coupling device using an attachment tool in accordance with certain aspects of the present disclosure.

With reference to FIG. 9, a method of installation of the mechanical-coupling device is described. Shown in FIG. 9 is a flow diagram illustrating a method 900 for mechanically coupling an anchor nut to a bolt in a mechanical-coupling device, such as the mechanical-coupling device 100 in FIG. 1 or the faucet assembly 600 in FIG. 6, using an attachment tool. During attachment of the mechanical-coupling device to a mounting material (such as, but not limited to, a hollow wall, countertop, or sink), the mechanical-coupling device is inserted through a hole (operation 910) in the wall or countertop until anchor wings on an anchor nut deploy. Then, a retraction force is applied (operation 912) using an attachment tool that removeably mechanically couples to a fixture on a bolt head of the mechanical-coupling device. Next, the attachment tool is rotated (operation 914) about a symmetry axis of the bolt, so that a distance between the bolt head and the anchor wings decreases.

In some embodiments of the method 900, there may be additional or fewer operations. Moreover, the order of the operations may be changed, and/or two or more operations may be combined into a single operation.

Figure 10A:
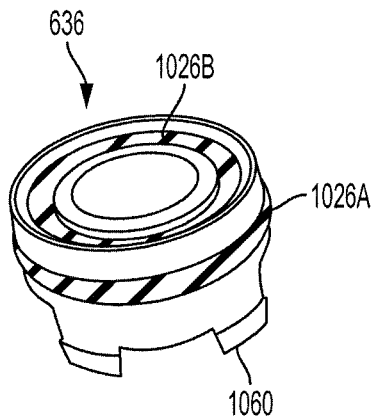
FIG. 10A is a drawing illustrating a perspective view of a sleeve of the faucet assembly in accordance with certain aspects of the present disclosure.

With reference to FIGS. 10A-E, an exemplary embodiment of the faucet assembly according to the present invention is illustrated. Shown in FIG. 10A is a sleeve 636 which includes a first fluid-sealing mechanism 1026A on an outer side surface of the sleeve 636 that may provide a fluid-tight seal with an inner surface of the bolt (see 610 of FIG. 10C), and a second fluid-sealing mechanism 1026B on an upper or top side of the sleeve 636 that may provide a fluid-tight seal with the faucet fixture (see 624 of FIG. 10B). Also shown are tabs 1060 which are positioned on an outer surface of the sleeve along a radial perimeter. Two or more tabs 1060 may be included, wherein the tabs may mechanically engage an inner surface of the bolt 610. The inner surface may include matching indents that may hold the sleeve 636 securely within the bolt 610 (see for example the indented lip 1105 on the inner surface 614 of the bolt 610 shown in FIG. 11B).

Figure 10B:
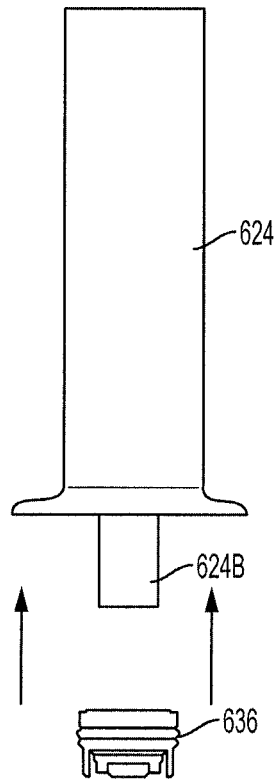
FIG. 10B is a drawing illustrating a side view of installation of the sleeve of FIG. 10A on a shank of a faucet.

As shown in FIG. 10B, a shank 624B of a faucet fixture 624 may be pushed into the sleeve 636 to secure the sleeve 636 thereon. The shank 624B may be an externally threaded water connection pipe. As such, the sleeve 636 may be threadedly attached to the shank 624B.

Figure 10C:
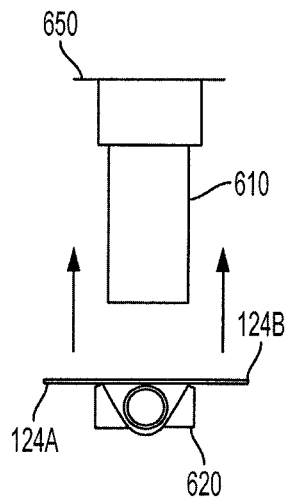
FIG. 10C is a drawing illustrating a side view of the connection between a toggle nut and a toggle bolt of the faucet assembly in accordance with certain aspects of the present disclosure.
Figure 10D:
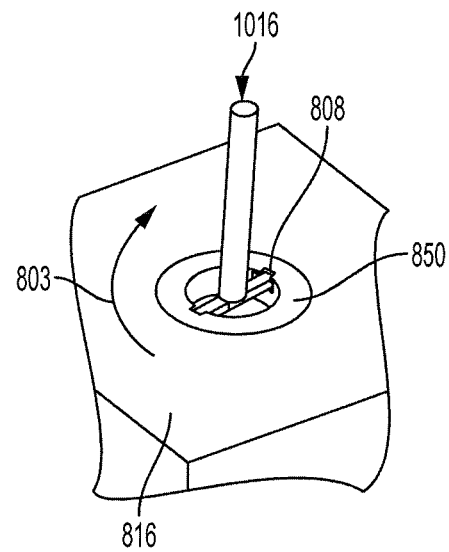
FIG. 10D is a drawing illustrating a perspective view of an attachment tool remateably mechanically coupled to a fixture on the faucet assembly of FIG. 10C.

As shown in FIG. 10C, the anchor nut 620 which includes one or more anchor wing(s) (124A, 124B) may be attached to a lower portion of the bolt 610 (generally opposite from the integral lip 650). This may be via mated threads on an outer surface of the bolt 610 and inner surface of the anchor nut 620. The bolt 610 and anchor nut 620, including the anchor wing(s) (124A, 124B), is then pushed through a hole in the barrier 816, such as shown in FIG. 10D. An attachment tool 1016 engaged with an attachment surface 808 of the bolt 610, may exert a pulling force (in direction 802; FIG. 8B) and a rotational force (in direction 803) to secure the bolt and anchor nut on the barrier 816. With reference to FIG. 8C, the attachment surface 808 may include slots and/or an inner lip that may allow the attachment tool to be remateably mechanically engaged with the bolt 610. While a specific configuration is shown in FIGS. 8C and 10D, other designs and configurations may allow remateable mechanical attachment between an attachment tool and a bolt, and are within the scope of the present invention.

Once the bolt 610 and anchor nut 620 having an anchor wing(s) (124A, 124B) is secured on the barrier 816, the faucet fixture 624 having the attached sleeve 636 engaged thereon may be pushed into the bolt 610, as illustrated in FIG. 10E. The tabs 1060 of the sleeve 636 may engage with an inner surface of the bolt 610 to secure the faucet fixture 624 on the barrier. FIG. 10F illustrates the mechanical-coupling device fully installed on a countertop with a faucet fixture secured therein.

Figure 11A:
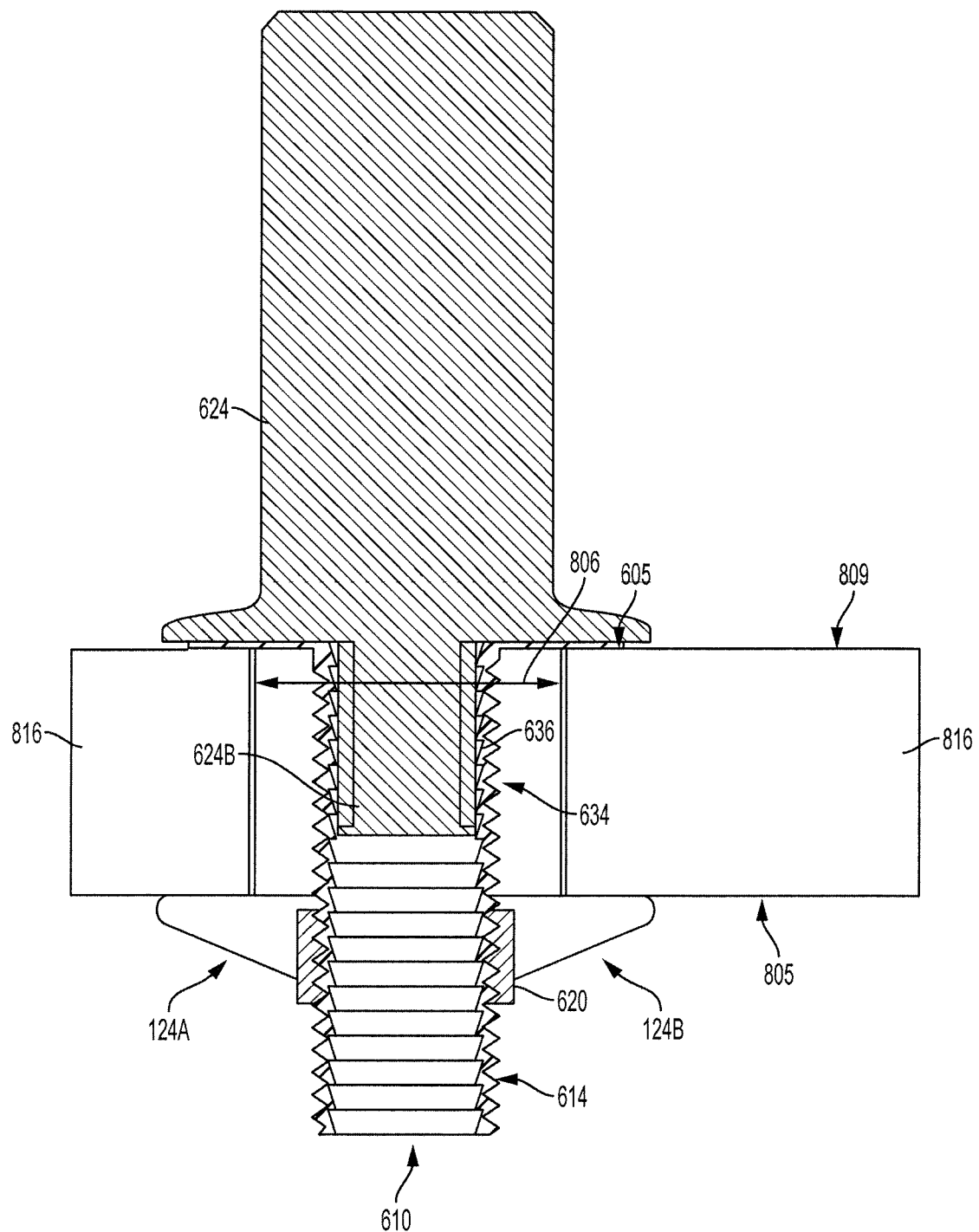
FIG. 11A is a drawing illustrating a cross sectional view taken along line 11-11 of FIG. 10F showing a connection means between the sleeve and the bolt body.
Figure 11B:
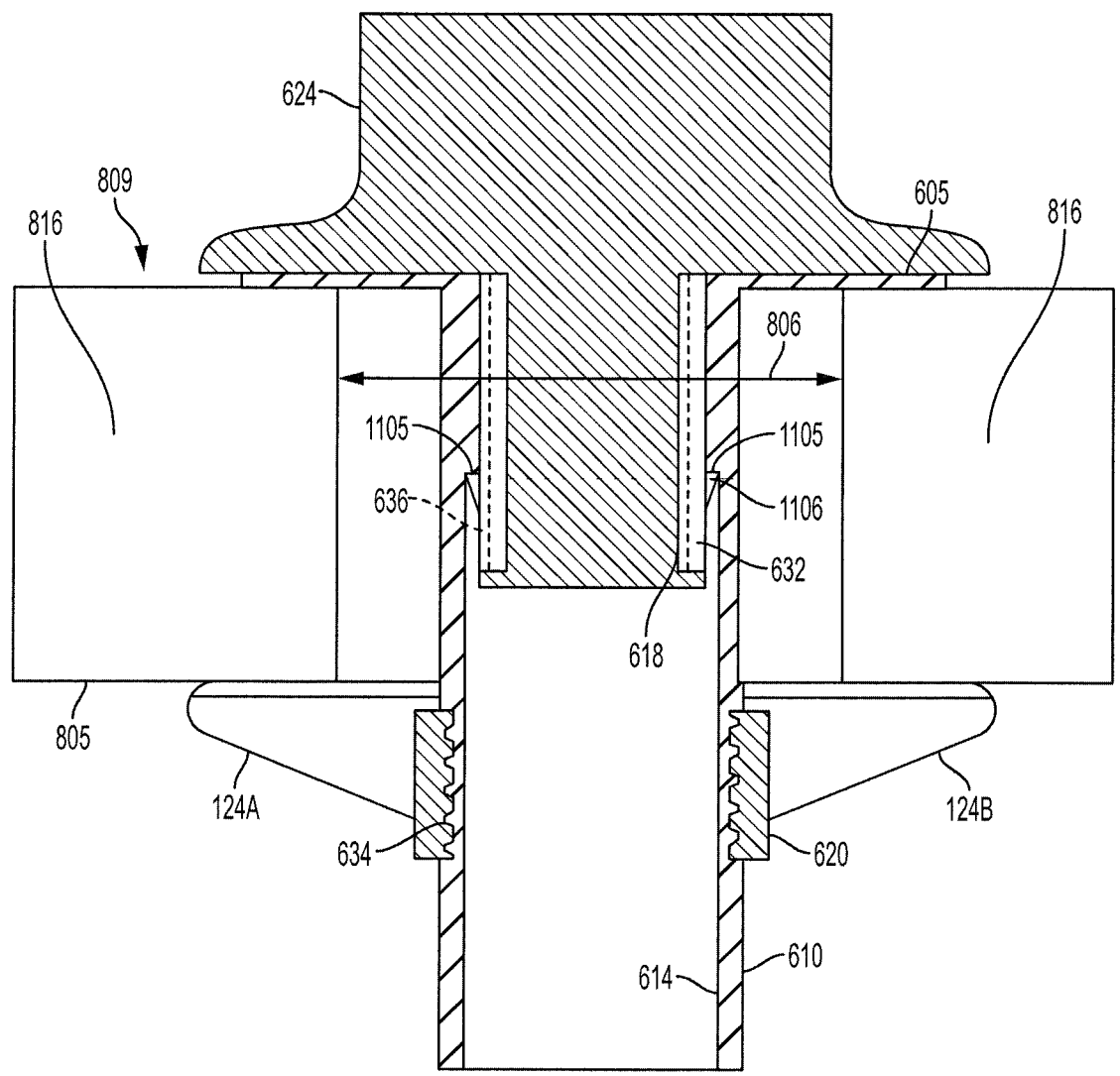
FIG. 11B is a drawing illustrating a cross sectional view taken along line 11-11 of FIG. 10F showing an alternative connection means between the sleeve and the bolt body.

As shown in FIGS. 11A and 11B, various arrangements and configurations for securing the sleeve 636 and the bolt 610 are envisioned and within the scope of the present invention. For example, in FIG. 11A, which is a cross-sectional view taken along line 11-11 of FIG. 10F, the sleeve 636 is shown to have both an inner thread which may be used to secure the sleeve 636 to the shank 624B of the faucet fixture 624, and an outer thread that may be used to secure the sleeve 636 to the bolt 610. As indicated above, the outer thread on the sleeve 636 may not necessarily be intended for rotational attachment of the sleeve 636 to the bolt 610, but may be used to provide connection between mated threads or ribs on the bolt 610 and sleeve 636. That is, the sleeve 636 may simply be pushed into the bolt 610 to provide a secure connection between the sleeve and the bolt, where the ribs may act as ribs on a zip tie which allow movement in one direction only.

For example, during assembly, a clamping force between components in the faucet assembly 600 may be achieved by the toggle bolt 610 from below the barrier 816 (e.g., countertop or sink) and a threaded sleeve 636 from above the barrier 816. The sleeve 636 having internal ribs or threads may be threaded (or press-fit) onto the shank 624B of the faucet fixture 624 using mated threads or ribs on an external surface of the shank 624B. The faucet fixture having the sleeve attached thereto may then by threaded (or press-fit) into the faucet assembly 600 using mated threads or ribs on an external surface of the sleeve 636 and an internal surface of the bolt 610.

Thus, installation of the mechanical-coupling device of the present invention in barrier 818 such as, for example, a sink or countertop, includes partially threading the anchor nut 620 with anchor wings (124A, 124B) onto the bolt 610, and pushing this assembly through a hole in the countertop or the sink until the anchor wings (124A, 124B) of the bolt 610 engage (become fully extended). Full extension of the anchor wings may occur without additional force, such as when the resting state of the anchor wings is fully extended (as shown in FIG. 8B), or may occur when a retraction force is applied to the fixture 808 on the bolt 610 (see FIG. 8C), such as when the resting state of the anchor wings is not fully extended. Next, the anchor nut 620 may be secured snuggly into place by rotating the bolt 610 while simultaneously pulling up to engage the anchor wings (124A, 124B) on an inner surface of the barrier 818. Furthermore, the sleeve 636 may be screwed onto the shank 624B of the faucet fixture 624 until it bottoms out (i.e., reaches a mechanical stop on an inner surface of the faucet fixture), and the combined assembly may then be pushed into the sleeve until the entire assembly bottoms out (i.e., reaches a mechanical stop on an outer surface of the bolt 610, such as the integral lip 650), thereby holding it firmly in place.

As shown in FIG. 11B, the sleeve 636 may include two or more tabs 1106 (as also shown in FIG. 10A) that project from an outer surface 632 of the sleeve 636 and which are designed to engage a lip 1105 on an inner surface 614 of the bolt 610. As such, the bolt 610 may use a snap-in mechanism to secure the sleeve 636 and faucet shank 624B. In particular, this configuration may use an anchor nut 620 and a bolt 610 to anchor the faucet assembly 600, and, during assembly, a sleeve 636 may be threaded onto the faucet fixture 624 along the shank 624B. However, instead of using ribs to hold the faucet fixture 624 and sleeve 636 in place within the bolt 610 using the 'zip tie' effect or threaded mechanism as described above, the sleeve 636 may snap into place. Note that the sleeve 636 may include molded plastic with a molded snap-in feature, or may be a metal piece with spring loaded fins to hold it in place. When the sleeve 636 is fully engaged, it may snap in place, thereby securely holding the faucet assembly 624.

Another configuration for the mechanical-coupling device of the present invention may use an anchor nut 620 such as described above with direct threads, thus removing the need for an intervening sleeve 636. As indicated above, the anchor nut 620 and bolt 610 may achieve the clamping force, however during assembly, the faucet shank 624B may screw directly into the anchor nut 620. In particular, the anchor nut 620 may be partially threaded onto the faucet shank 624B, after which it may be pushed through the hole in the barrier 818 until the anchor wings (124A, 124B) engage. Next, the faucet fixture 624 may be threaded into the anchor nut 620 until snug.

Figure 12A:
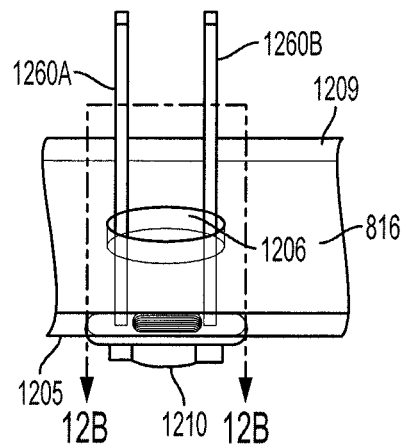
FIG. 12A is a drawing illustrating a perspective view of several of the components in a faucet assembly inserted through a barrier in accordance with certain aspects of the present disclosure.
Figure 12B:
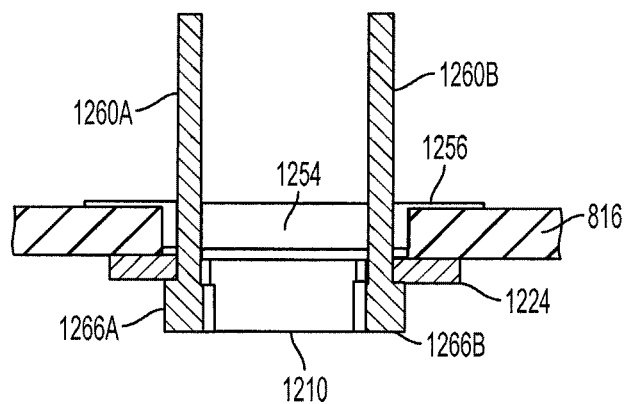
FIG. 12B is a drawing illustrating a cross sectional view taken along line 12-12 of FIG. 12A which includes the fixture.
Figure 12C:
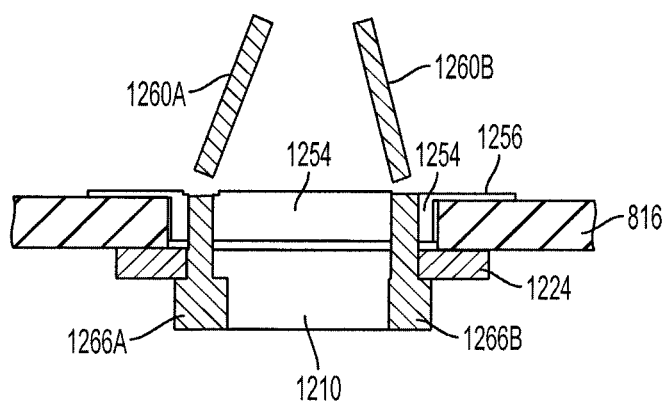
FIG. 12C is a drawing illustrating a cross sectional view taken along line 12-12 of FIG. 12A which includes the fixture and shows snapping of the toggle guides.

With reference to FIGS. 12A-12C, the mechanical-coupling device of the present invention may comprise an anchor nut 1210 having an internal bore defined by an inner surface and a symmetry axis, and a bolt 1254 configured to mechanically couple to the anchor nut 1210, the bolt 1254 having an internal bore defined by an inner surface and a symmetry axis, and laterally extending tabs 1256. After coupling of the anchor nut 1210 to the bolt 1254, the symmetry axis of each may be concentric.

The anchor nut 1210 may include an anchor nut body, at least two anchor wings 1224 extending radially from the anchor nut body in a direction perpendicular to the symmetry axis of the internal bore, and at least two anchor tabs (1260A, 1260B) extending axially from the anchor nut body in a direction parallel with the symmetry axis of the anchor nut body. A lower portion of each anchor tab (1266A, 1266B) may be integral with, or attached to, the anchor nut body. As shown, this lower portion may be coincident with a position of the anchor wings 1224 on the anchor nut body.

Mechanical coupling of the bolt 1254 to the anchor nut 1210 may include passing the anchor tabs (1260A, 1260B) of the anchor nut 1210 through respective apertures (not shown) in the bolt 1254. That is, the anchor tabs (1260A, 1260B) are configured to mechanically couple the anchor nut 1210 to the bolt 1254 by passage through corresponding anchor tab apertures on the bolt 1254, in a direction parallel to the symmetry axis of the internal bores of each of the anchor nut body and the bolt, so that the internal bore of the anchor nut body and the internal bore of the bolt 1254 are concentric when viewed along the symmetry axis of the bolt.

As shown in FIG. 12C, and with reference to like reference numbers as found in FIG. 11A, after mechanical coupling of the anchor nut 1210 to the bolt 1254, the at least two anchor tabs (1260A, 1260B) are designed so that the portion of each which extends beyond a top surface of the bolt 1254 is configured to be snapped, broken, or cut off.

As shown in FIG. 12A, the anchor wings 1224 are non-moveable with respect to the anchor nut 1210, and thus may extend beyond a diameter of the hole 1206 in the barrier 816. A method for pushing the anchor nut 1210 through the hole 1206 in the barrier 816 includes applying an uneven deployment force to each of the two anchor tabs (1260A, 1260B) to move the anchor nut 1210 through the hole 1206. This deployment force may be in a direction parallel to the symmetry axis of the internal bore in the anchor nut 1210 so that the uneven nature of the deployment force causes the anchor nut body to be positioned at an angle relative to the plane of the hole 1206 in the barrier 816. That is, the angle may be defined by a radial plane of the internal bore of the anchor nut body and the symmetry axis of the hole 1206, wherein the angle is not 90 degrees.

Once the anchor nut 1210 has passed through the hole 1206 in the barrier 816, a retraction force may be applied to the two anchor tabs (1260A, 1260B) in a direction parallel to the symmetry axis of the hole 1206 and anti-parallel to the deployment force, wherein the retraction force moves the anchor nut body to a position such that the angle defined by a radial plane of the internal bore of the anchor nut body and the symmetry axis of the hole 1206 is 90 degrees. The retraction force brings the two anchor wings 1224 into contact a bottom surface 1205 of the barrier 816 which fixes a position of the anchor nut 1210.

The anchor nut 1210 would then be mechanically coupled to the bolt 1254 as described above so that the laterally extending tabs 1256 of the bolt 1254 come into contact with an upper surface 1209 of the barrier 818. In this way, the connection between the anchor nut 1210 and the bolt 1254 may be tightened on the barrier 816 to securely hold the mechanical-coupling device thereon.

In another configuration, the two anchor wings 1224 may be rotatably mechanically coupled to the anchor nut 1210, wherein rotation of the anchor wings 1224 between a deployed position and a retracted position is about the axis that is perpendicular to the symmetry axis of the internal bore of the anchor nut body. As also described above, in this case, a deployment force, along a first direction parallel to the symmetry axis, may be applied to the anchor nut 1210 at a first off-axis position relative to the symmetry axis, so that a resulting deployment torque may rotate the anchor wings 1224 until limited by a first mechanical stop so that a radial extent of the anchor wings in the deployed position is a predefined distance from the symmetry axis of the internal bore of the anchor nut body. A retraction force, along a second direction parallel to the symmetry axis and anti-parallel to the first direction, may then be applied to the anchor wings 1224 at a second off-axis position relative to the symmetry axis, so that a resulting retraction torque may rotate the anchor wings until limited by a second mechanical stop so that a radial extent of the anchor wings is greater than the predefined distance.

Furthermore, and as also described above, mechanical coupling of the anchor nut 1210 to the bolt 1254 causes the anchor wings 1224, when in the deployed position, to contact an bottom surface 1205 of the barrier 816 which fixes a position of the anchor nut so that a distance between the anchor nut 1210 and the bolt 1254 may be decreased; the bolt held in place on the top surface 1209 of the barrier 816 by the laterally extending tabs 1256. While described as tabs 1256, a radial extension of the bolt 1254 is also within the scope of the present invention.

A sleeve 636, such as disclosed herein, may be positioned on a shank 624B of a faucet fixture 624. The faucet fixture 624 may then be secured on the barrier 816 by pushing the faucet shank 624B with the attached sleeve 636 into the anchor nut 620 and bolt 610. As indicated above, ribs, threads, or a snap-in feature may be used to secure the sleeve 636 within the anchor nut 620 and bolt 610.

Figure 13A:
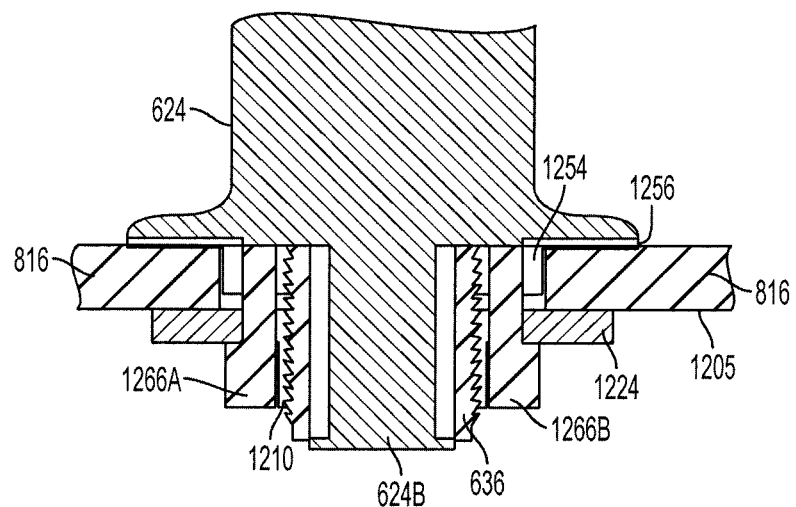
FIG. 13A is a drawing illustrating a cross sectional view taken along line 12-12 of FIG. 12A which includes the fixture and has a faucet shank installed therein.
Figure 13B:
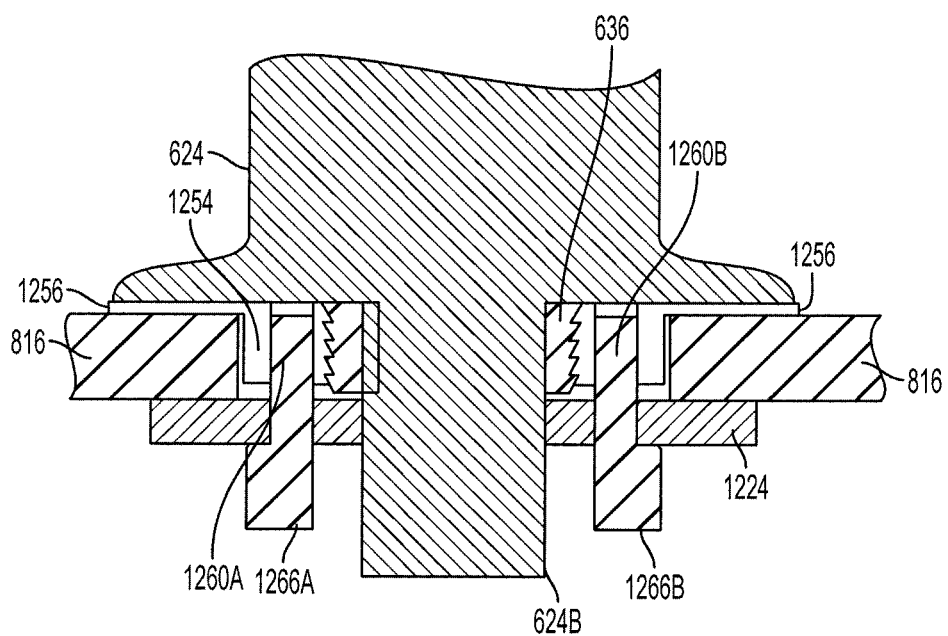
FIG. 13B is a drawing illustrating a cross sectional view of an alternative faucet assembly taken along the same plane as shown in FIG. 12A.

With reference to FIG. 13A, the anchor nut 1210 may include ribs, threads, or a snap-in feature (see for example the snap-in mechanism shown in FIG. 11B). For example, the internal bore of the anchor nut 1210 may include ribs that allow the shank 624B of the faucet fixture 624, having a ribbed sleeve 636 attached thereon, to be attached using the 'zip tie' effect described above. Alternately, and as shown in FIG. 13B, the bolt 1254 may include ribs, threads, or a snap-in feature that allow the shank 624B of the faucet fixture 624, having a sleeve 636 attached thereon, to be secured. This latter configuration may be easier to install, but may rely on the integrity of the anchor tabs (1260A, 1260B) to maintain the clamping force.

In the preceding description, we refer to 'some embodiments.' Note that 'some embodiments' describes a subset of all of the possible embodiments, but does not always specify the same subset of embodiments.

The present invention also provides kits comprising the various components of the faucet assembly 600, such as any of the various anchor nuts and bolts described herein. The kits may include an adapter (e.g., an attachment tool) configured to work with the enclosed faucet assembly 600. The kits may further include a written and/or illustrated insert which may describe a method of use of the components of the kit. In certain kits, a single (1) adapter may be included with a larger number of faucet assembly 600 components.

In an exemplary embodiment, the mechanical-coupling device can be mounted through a barrier 816 such as a countertop or a sink having a thickness 16, 18, or 20 gauge metal, or of between 0.1 inches and 12 inches, such as between 0.5 inches and 6 inches, or even 0.5 inches and 1.9 inches, using a hole 806 in the barrier having a diameter between 0.2 inches and 6 inches, such as 0.5 inches and 2 inches, or even 1.05 inches and 1.375 inches.

The various examples of fixtures and tension-based mechanical coupling devices disclosed herein may find utility, and/or may be included, on other types of bolts than a toggle bolt. For example, the fixtures shown in any of FIGS. 1-11B, that provide a means to produce a pulling force or tension on the bolt, may be included on the heads for bolts and/or screws (such as a bolt and/or screw for use with a nut that does not include anchor wings) and/or other types of anchors. These disclosed fixtures may keep a screwdriver, drill bit or hand-tool in contact with the bolt during installation, thus enabling the user to simultaneously pull back to engage an anchor and rotate inward to secure the bolt. While a nut, anchor wings, or snap tabs have been shown and described in the present disclosure, any other type of anchor that may provide a counter force to the pulling force or tension applied to the bolt may be used and is within the scope of the present invention.

Furthermore, while the various embodiments of fixtures and tension-based mechanical coupling devices disclosed herein and shown in any of FIGS. 1-13B, indicate usefulness with a bolt, other types of fastening devices are within the scope of the present invention. For example, screws that may be installed using an anchor to provide counter force are possible, as are fastening devices that do not require or use a separate anchor component to provide the counter force. Exemplary of such are standard screws or machine screws, which are threaded fasteners that may be used with or without a nut or driven into a tapped hole. The fixtures disclosed herein may keep a screwdriver, drill bit or hand-tool in contact with the fastener during installation, thus enabling the user to secure the fastener without additional tools or support.

The foregoing description is intended to enable any person skilled in the art to make and use the disclosure, and is provided in the context of a particular application and its requirements. Moreover, the foregoing descriptions of various embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A mechanical-coupling device comprising:
   a bolt having a bolt body and a bolt head attached to the bolt body, wherein at least a portion of the bolt body has threads and the bolt head includes a fixture configured to remateably mechanically couple to an attachment tool;
   an anchor nut configured to rotatably mechanically couple to the bolt using the threads on the bolt body, wherein rotation of the anchor nut is about a symmetry axis of the bolt body; and
   an anchor wing rotatably mechanically coupled to the anchor nut, wherein rotation of the anchor wing, between a deployed position and a retracted position, is about an axis approximately perpendicular to the symmetry axis of the bolt body,
   wherein, in the absence of an external force, the anchor wings remain in the deployed position, extending substantially perpendicular to the symmetry axis of the bolt and radially outward from the bolt,
   wherein, during mechanical coupling of the anchor nut to the bolt with a mounting material between the bolt head and the anchor nut, the fixture is configured to convey:
      a pulling force, from the attachment tool, that results in fixing a position of the anchor nut with the anchor wing in the deployed position, and
      a rotational torque, from the attachment tool, about the symmetry axis of the bolt body that rotates the bolt relative to the fixed position of the anchor nut so that a distance between the bolt head and the anchor nut decreases, and
   wherein the bolt body comprises an axial bore therethrough defining an internal passage having an inner surface, the axial bore aligned with the symmetry axis of the bolt body.

2. A mechanical-coupling device, comprising:
   a bolt having a bolt body and a bolt head attached to the bolt body, wherein at least a portion of the bolt body has threads and the bolt head includes a fixture configured to remateably mechanically couple to an attachment tool, and wherein the bolt body comprises an axial bore defining an internal passage having an inner surface, the axial bore aligned with a symmetry axis of the bolt body;
   an anchor nut configured to rotatably mechanically couple to the bolt using the threads on the bolt body, wherein rotation of the anchor nut is about the symmetry axis of the bolt body;
   an anchor wing rotatably mechanically coupled to the anchor nut, wherein rotation of the anchor wing, between a deployed position and a retracted position, is about an axis approximately perpendicular to the symmetry axis of the bolt body; and
   a sleeve configured to mechanically couple to the bolt within the axial bore of the bolt body, and to extend the internal passage of the bolt body with a second internal passage of the sleeve, which is defined by an inner surface of a bore of the sleeve, wherein, in the absence of an external force, the anchor wings remain in the deployed position, extending substantially perpendicular to the symmetry axis of the bolt and radially outward from the bolt, wherein, during mechanical coupling of the anchor nut to the bolt with a mounting material between the bolt head and the anchor nut, the fixture is configured to convey:
- a pulling force, from the attachment tool, that results in fixing a position of the anchor nut with the anchor wing in the deployed position, and
- a rotational torque, from the attachment tool, about the symmetry axis of the bolt body that rotates the bolt relative to the fixed position of the anchor nut so that a distance between the bolt head and the anchor nut decreases, and wherein, when the sleeve is mechanically coupled to the bolt, the internal passage of the bolt body and the internal passage of the sleeve are concentric when viewed along the symmetry axis of the bolt body.

3. The device of claim 2, wherein the sleeve is configured to mechanically couple to an outer surface of a faucet fixture, and wherein the mechanical-coupling device is configured to mount the faucet fixture onto one of a countertop and a sink without a second attachment tool fixing the position of the anchor nut.

4. The device of claim 2, wherein the sleeve includes a fluid-sealing mechanism along a portion of an outer surface of the sleeve, and wherein the fluid-sealing mechanism is configured to make a fluid-tight seal with an outer surface of the faucet fixture, the inner surface of the bolt body, or both.

5. The device of claim 4, wherein the fluid-sealing mechanism includes an O-ring, a gasket, a seal, or any combination thereof.

6. A mechanical-coupling device comprising:
a bolt comprising:
- a bolt body having an internal bore defined by an internal surface and a symmetry axis, wherein at least a portion of the bolt body has threads on an outer surface, and
- a bolt head attached to the bolt body and including a fixture configured to remateably mechanically couple to an attachment tool;

a sleeve configured to mechanically couple to the bolt, wherein the sleeve has an internal passage, defined by an inner surface, having a second symmetry axis that is parallel to the symmetry axis of the bolt body, wherein the inner surface of the sleeve has a diameter that fits around a diameter of an outer surface of a faucet fixture, and wherein the sleeve includes a fluid-sealing mechanism positioned along a portion of the sleeve which is configured to make a fluid-tight seal with the faucet fixture, the bolt, or both;

an anchor nut configured to rotatably mechanically couple to the bolt using the threads on the outer surface of the bolt body, wherein rotation of the anchor nut is about the symmetry axis of the bolt body; and an anchor wing rotatably mechanically coupled to the anchor nut, wherein rotation of the anchor wing, between a deployed position and a retracted position, is about an axis approximately perpendicular to the symmetry axis of the bolt body, wherein, when a deployment force, along a first direction parallel to the symmetry axis, is applied to the anchor wing at a first off-axis position relative to the symmetry axis, a resulting deployment torque rotates the anchor wing until limited by a first mechanical stop so that a radial extent of the anchor wing in the deployed position is a predefined distance from the symmetry axis;

wherein, when a retraction force, along a second direction parallel to the symmetry axis and anti-parallel to the first direction, is applied to the anchor wings at a second off-axis position relative to the symmetry axis, a resulting retraction torque rotates the anchor wing until limited by a second mechanical stop so that a radial extent of the anchor wing is greater than the predefined distance; and wherein during mechanical coupling of the anchor nut to the bolt:
- the fixture is configured to receive the retraction force, from the attachment tool, along the second direction that results in friction between the anchor wing in the deployed position and an internal surface, in contact with the anchor wing, which fixes a position of the anchor nut; and
- the fixture is configured to receive, concurrently with the retraction force, a rotational torque, from the attachment tool, about the symmetry axis that rotates the bolt relative to the fixed position of the anchor nut so that a distance between the bolt head and the anchor nut decreases.

7. The device of claim 6, comprising two or more anchor wings evenly spaced about a circumference of the anchor nut.

8. The device of claim 6, wherein the mechanical-coupling device is configured to mount a faucet fixture onto one of a countertop and a sink without a second attachment tool fixing the position of the anchor nut.

9. The device of claim 6, wherein the fluid-sealing mechanism includes one of an O-ring, a gasket, and a seal.

10. A mechanical-coupling device comprising:
an anchor nut comprising:
- an anchor nut body having an internal bore defined by an inner surface and a symmetry axis,
- at least two anchor wings extending radially from the anchor nut body in a direction perpendicular to the symmetry axis of the internal bore, and
- at least two anchor tabs extending axially from the anchor nut body in a direction parallel with the symmetry axis of the anchor nut body, each anchor tab having ribs on a portion of a surface thereof; and a bolt configured to mechanically couple to the anchor nut, the bolt having an internal bore defined by an inner surface and a symmetry axis, and at least two anchor tab apertures configured to receive the at least two anchor tabs, wherein the at least two anchor tabs are configured to mechanically couple the anchor nut to the bolt by passage through each of the at least two anchor tab apertures on the bolt, in a direction parallel to the symmetry axis of the internal bores of each of the anchor nut body and the bolt, so that the internal bore of the anchor nut body and the internal bore of the bolt are concentric when viewed along the symmetry axis of the bolt, and wherein, after mechanical coupling of the anchor nut to the bolt, the at least two anchor tabs are designed so that a portion of each which extends beyond a top surface of the bolt are configured to be snapped, broken, or cut off.

11. The device of claim 10, wherein the at least two anchor wings are rotatably mechanically coupled to the anchor nut, wherein rotation of the anchor wings between a deployed position and a retracted position is about the axis that is perpendicular to the symmetry axis of the internal bore of the anchor nut body.

12. The device of claim 11, wherein, when a deployment force, along a first direction parallel to the symmetry axis, is applied to the anchor nut at a first off-axis position relative to the symmetry axis, a resulting deployment torque rotates the anchor wings until limited by a first mechanical stop so that a radial extent of the anchor wings in the deployed position is a predefined distance from the symmetry axis of the internal bore of the anchor nut body;

wherein, when a retraction force, along a second direction parallel to the symmetry axis and anti-parallel to the first direction, is applied to the anchor wings at a second off-axis position relative to the symmetry axis, a resulting retraction torque rotates the anchor wings until limited by a second mechanical stop so that a radial extent of the anchor wings is greater than the predefined distance; and wherein, during mechanical coupling of the anchor nut to the bolt, the anchor wings in the deployed position contact an internal surface which fixes a position of the anchor nut so that a distance between the anchor nut and the bolt is decreased.

13. The device of claim 10, wherein the at least two anchor wings are non-rotatably attached to the anchor nut and extend radially from the anchor nut body in the direction perpendicular to the symmetry axis of the internal bore of the anchor nut body.

14. The device of claim 13, wherein during mechanical coupling of the anchor nut to the bolt:

an uneven deployment force is applied to each of the at least two anchor tabs to move the anchor nut through an orifice in a barrier, wherein the deployment force is along a direction parallel to a symmetry axis of the orifice and the uneven deployment force causes the anchor nut body to be positioned at an angle defined by a radial plane of the internal bore of the anchor nut body and the symmetry axis of the orifice, wherein the angle is not 90 degrees; and a retraction force is applied to the at least two anchor tabs in a direction parallel to the symmetry axis of the orifice and anti-parallel to the deployment force, wherein the retraction force moves the anchor nut body to a position wherein the angle defined by a radial plane of the internal bore of the anchor nut body and the symmetry axis of the orifice is 90 degrees so that the at least two anchor wings contact an internal surface of the barrier which fixes a position of the anchor nut, wherein, when the anchor nut body is mechanically coupled to the bolt, the symmetry axis of the anchor nut body and the symmetry axis of the bolt are concentric.

15. The device of claim 10, further comprising:

a sleeve having an internal passage defined by an inner surface and a symmetry axis, wherein the sleeve is configured to mechanically couple to an outer surface of a faucet fixture, and wherein the mechanical-coupling device is configured to mount the faucet fixture having the sleeve positioned thereon onto one of a countertop and a sink.

16. The device of claim 15, wherein the sleeve includes a fluid-sealing mechanism along a portion of an outer surface of the sleeve, and wherein the fluid-sealing mechanism is configured to make a fluid-tight seal with an outer surface of the faucet fixture, the inner surface of the bolt, or both.

17. The device of claim 15, wherein at least a portion of the internal surface of the bolt has threads or ribs that mechanically couple with threads or ribs on the outer surface of the sleeve.

18. The device of claim 15, wherein at least a portion of the internal surface of the anchor nut body has threads or ribs that mechanically couple with threads or ribs on the outer surface of the sleeve.

* * * * *